G. A. SMITH.
RATCHET WRENCH.
APPLICATION FILED JUNE 7, 1919.
1,338,257.
Patented Apr. 27, 1920.
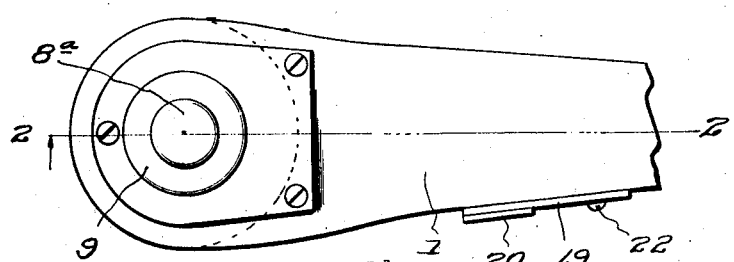
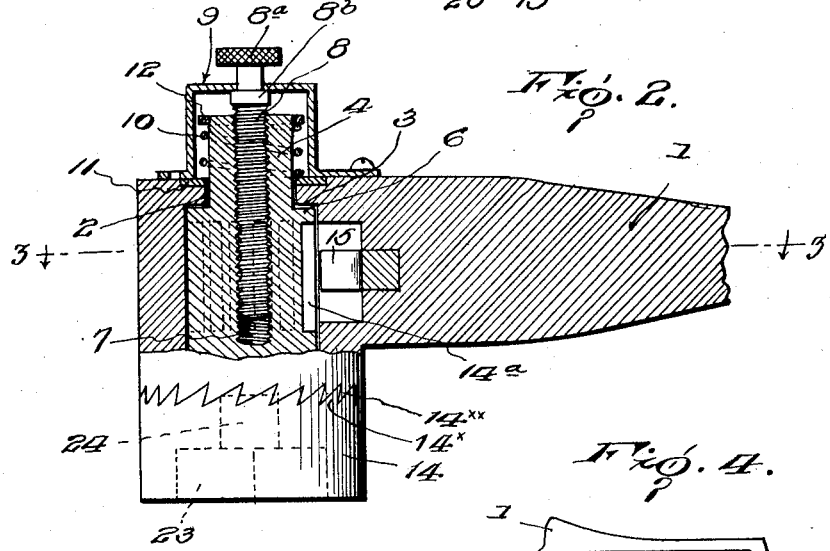
Inventor
Geo. A. Smith.
By Fred P. Jorivi
Attorney

UNITED STATES PATENT OFFICE.

GEORGE A. SMITH, OF SEATTLE, WASHINGTON.

RATCHET-WRENCH.

1,338,257.  Specification of Letters Patent.  Patented Apr. 27, 1920.

Application filed June 7, 1919. Serial No. 302,389.

*To all whom it may concern:*

Be it known that I, GEORGE A. SMITH, a citizen of the United States, residing at Seattle, in the county of King and State of Washington, have invented certain new and useful Improvements in Ratchet-Wrenches, of which the following is a specification.

This invention relates to improvements in ratchet wrenches.

The object of the invention is to provide a tool, which will perform its function when operable in a clockwise or anti-clockwise direction.

The invention also comprehends improvements in the details of construction and arrangement of parts which will be hereinafter described, and particularly pointed out in the claim.

In the drawings:—

Figure 1 is a plan view of the improved wrench.

Fig. 2 is a section on the line 2—2 of Fig. 1, showing the device in an operative position for use in a clockwise direction.

Fig. 3 is a section on the line 3—3 of Fig. 2 with some of the parts omitted.

Fig. 4 is a detail view of the pawl engaging plate.

Referring more particularly to the drawings, the numeral 1, indicates a body portion formed with a handle, and at one end said body portion is provided with an opening 2, formed with a flange 3. 4 indicates a main shaft having a reduced end at 5, and mounted to rotate in the opening 2. The reduced end forms a shoulder 6, which seats against the flange 3. The shaft 4 is formed with a threaded opening 7 and engaging therein is a screw 8, swiveled at one end with a plate 9 secured on the outside of the body portion 1. The upper end of the screw 8, is formed with a head $8^a$ spaced from the shoulder $8^b$ of the swivel in the cap, to allow of a limited movement of the shaft and the screw, which will hereinafter appear. A spring 10, is interposed between a bearing plate 11, on the body portion, and a nut 12, on the upper end of the shaft 4, said spring normally tending to force the shoulder 6 into contact with the flange 3. One end of shaft 4 is enlarged to form an annular shoulder 14, in the surface of which are cut teeth $14^x$, adapted to coöperate with corresponding teeth $14^{xx}$, cut in the adjacent surface of the main body 1. Around the peripheral surfaces of the main shaft 4 are formed vertical grooves or teeth $14^a$.

15 indicates a pawl pivoted at 11', and against one end thereof bears one end of a spring 16, the other end bearing against the inner wall 17 of a chamber 18 formed in the main body 1, so as to normally force the outer end of the pawl out of engagement with the teeth $14^a$ as seen in Fig. 3. Upon the main body 1 is slidably mounted a plate 19, knurled as at 20, and formed with a slot 21, through which projects a screw 22, the plate being positioned to be moved to engage the tail end of the pawl to position its opposite end to engage with the teeth $14^a$.

23 indicates an angular cavity in the lower end of the main shaft 4, said cavity being counterbored as at 24.

By adjusting the screw 8, the main shaft 4 is moved to bring the shoulder 6 into engagement with the flange 3, and the teeth $14^x$ on the shoulder 14, and the adjacent teeth $14^{xx}$ on the body are brought into engagement, as shown in Fig. 2, hence when the angular cavity is fitted down over a nut to be dealt with, the nut may be turned in a clock-wise direction, with a corresponding movement of the handle. If the work be so situated that a complete turn of the handle is not possible, a partial rotation thereof may be made until obstructed, whereupon retrograde movement of the handle is possible, the teeth $14^x$ on the shoulder 14, riding meanwhile over the teeth $14^{xx}$ on the body, against the tension of the spring 10, and when as much as possible of this retrograde movement has been accomplished, another reverse movement of the handle will cause a corresponding movement of the nut. Of course at this time the plate 19, is moved out of engagement with the tail end of the pawl to cause the spring to disengage the operative end from the teeth $14^a$.

The above description is for dealing with a right hand nut and bolt. If a left hand threaded nut and bolt are to be dealt with, the plate 19, is moved forward into its dotted position as seen in Fig. 3, which of course will act upon the tail end of the pawl 15, and thus compress the spring 12, moving the pawl about its pivot pin 11, and bringing the free ends into the dotted position, as shown in Fig. 3, in which position the pawl is in operative position with the vertical teeth $14^a$. The screw 8 is now turned to move the shaft 4, until the teeth on the shoulder 14 are forced out of contact with the teeth on the body portion. 15, is now in operative engagement with the teeth 14ª, and it will be seen that a movement of the handle in a counter-clockwise direction, will advance the nut. It is necessary to disengage plate 19 from pawl 15, before moving handle 1 in the reverse direction, it being necessary to disengage the plate with the pawl, as above described, to advance the nut farther.

Claim:—

A wrench, the combination of a handle having an opening, provided with an inwardly extending annular shoulder in the upper end thereof, and ratchet teeth formed on the handle about the lower end of the opening, a shaft having a reduced end provided with a threaded opening, and an enlarged end provided with ratchet teeth to engage the ratchet teeth on the handle, and a recess for engaging a nut, the shaft being also provided with teeth on its periphery, means tending to keep the shoulder formed by the reduced end of the shaft in engagement with said annular shoulder, a cap secured to the handle over the reduced end of said shaft, a set screw revolubly mounted in the cap having an annular shoulder and a threaded stem, the stem engaging the threaded opening in said shaft, a pawl mounted in the handle and adapted to engage the teeth on the shaft, a spring to normally disengage the pawl and means for engaging the pawl with the teeth whereby to turn a nut in one direction the set screw is turned to permit the ratchet teeth on the shaft to engage the ratchet teeth on the handle, and to turn a nut in the opposite direction the set screw is turned to disengage said ratchet teeth after which the pawl is caused to engage the teeth on the shaft by its engaging means.

In testimony whereof I affix my signature.

GEORGE A. SMITH.